United States Patent
Nakano et al.

(10) Patent No.: US 12,269,243 B2
(45) Date of Patent: Apr. 8, 2025

(54) BIAXIALLY-ORIENTED POLYPROPYLENE FILM

(71) Applicant: TOYOBO CO., LTD., Osaka (JP)

(72) Inventors: Mahiro Nakano, Inuyama (JP); Toru Imai, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 157 days.

(21) Appl. No.: 18/003,230

(22) PCT Filed: Jun. 14, 2021

(86) PCT No.: PCT/JP2021/022513
§ 371 (c)(1),
(2) Date: Dec. 23, 2022

(87) PCT Pub. No.: WO2022/004340
PCT Pub. Date: Jan. 6, 2022

(65) Prior Publication Data
US 2023/0330977 A1    Oct. 19, 2023

(30) Foreign Application Priority Data
Jul. 3, 2020    (JP) .................................. 2020-115577

(51) Int. Cl.
| | |
|---|---|
| *B32B 27/32* | (2006.01) |
| *B32B 7/022* | (2019.01) |
| *B32B 7/023* | (2019.01) |
| *B32B 7/03* | (2019.01) |
| *B32B 27/08* | (2006.01) |
| *C08J 5/18* | (2006.01) |

(52) U.S. Cl.
CPC .............. *B32B 27/32* (2013.01); *B32B 7/022* (2019.01); *B32B 7/023* (2019.01); *B32B 7/03* (2019.01); *B32B 27/08* (2013.01); *C08J 5/18* (2013.01); *B32B 2250/03* (2013.01); *B32B 2250/242* (2013.01); *B32B 2307/518* (2013.01); *B32B 2307/536* (2013.01); *B32B 2307/538* (2013.01); *B32B 2310/022* (2013.01); *B32B 2323/10* (2013.01); *C08J 2323/12* (2013.01)

(58) Field of Classification Search
CPC .......... B32B 7/02–7/023; B32B 27/32; B32B 27/327; B32B 2250/242; B32B 2250/03; B32B 2307/746
See application file for complete search history.

(56) References Cited

U.S. PATENT DOCUMENTS

| | | |
|---|---|---|
| 2009/0136714 A1 | 5/2009 | Itou |
| 2017/0157803 A1* | 6/2017 | Kuma ..................... B32B 27/20 |

FOREIGN PATENT DOCUMENTS

| | | | |
|---|---|---|---|
| WO | WO 2007/094072 A1 | 8/2007 | |
| WO | WO 2017/169952 A1 | 10/2017 | |
| WO | WO-2017170244 A1 * | 10/2017 | ............. B29C 55/12 |
| WO | WO 2018/142983 A1 | 8/2018 | |

OTHER PUBLICATIONS

European Patent Office, Extended European Search Report in European Patent Application No. 21834058.6 (Jun. 3, 2024).
Japan Patent Office, International Search Report in International Patent Application No. PCT/JP2021/022513 (Aug. 31, 2021).

* cited by examiner

*Primary Examiner* — Prashant J Khatri
(74) *Attorney, Agent, or Firm* — Leydig, Voit & Mayer, Ltd.

(57) ABSTRACT

The invention provides a biaxially-oriented polypropylene film that contains a base layer (A) comprising a polypropylene resin as a main component, a surface layer (B) provided at one side of the base layer (A), and a surface layer (C) provided at one side of the base layer (A) opposite to the surface layer (B), wherein the surface layer (B) has a wetting tension of 38 mN or more, a surface resistance value of 14.0 Log $\Omega$ or more, an arithmetic average roughness (Ra) of 3.0-5.5 nm, a Martens hardness of 248 N/mm$^2$ or less, and a center plane average surface roughness (SRa) of 0.010-0.026 μm, and the surface layer (C) has a center plane average surface roughness (SRa) of 0.020 μm or more and a Martens hardness of 270 N/mm$^2$ or more.

8 Claims, 1 Drawing Sheet

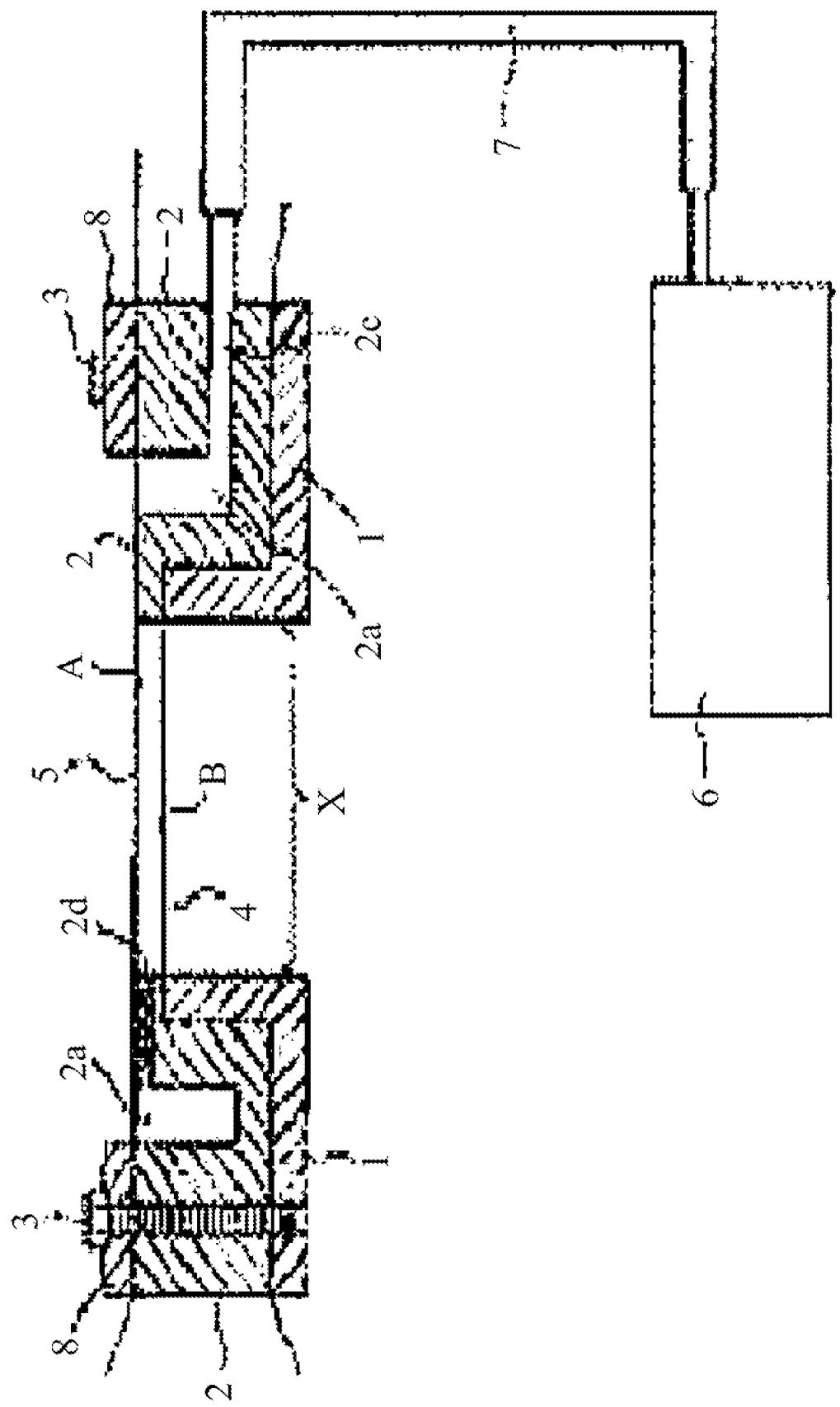

BIAXIALLY-ORIENTED POLYPROPYLENE FILM

TECHNICAL FIELD

The present invention relates to a biaxially oriented polypropylene film. Specifically, the present invention relates to a biaxially-oriented polypropylene film suitable for processing due to its excellent adhesion with a vapor deposited layer, a coating layer, or an adhesive, and reduced wrinkles and blocking of a roll in processing such as vapor deposition of inorganic or organic materials, coating, or lamination with other films.

BACKGROUND ART

Conventionally, biaxially-oriented polypropylene films have been widely used as packaging materials for various articles such as food or textile products due to its high transparency and excellent mechanical properties. Unfortunately, it is pointed out that polypropylene films have problems such as low surface energy due to non-polarity of polypropylene resin, leading to insufficient adhesive strength in processing such as vapor deposition of inorganic or organic materials, coating, or lamination with other films.

A thin layer formed by vapor deposition or coating has insufficient adhesive strength in addition to low barrier properties due to non-formation of the thin layer at convexities of irregular surfaces. In contrast, high flexibility and flatness of biaxially-oriented polypropylene films causes low slipperiness, leading to sticking of films known as blocking. Therefore, biaxially-oriented polypropylene films generally contain anti-blocking agents to have irregular surfaces. However, the surface irregularity causes insufficient formation of a thin layer by vapor deposition or coating, resulting in low barrier properties.

Moreover, biaxially-oriented polypropylene films are used for various food packaging, and the films generally contain the antistatic agents, which bleed out to the surface, to have increased antistatic properties, enabling powdered food or dried food to be kept from sticking to the films by static electricity. However, the antistatic agents on the surface of the film repel a coating solution and cause defects.

Various methods have been proposed to solve such problems. PTL1 discloses that branched-chain polypropylene is mixed with propylene resin to form surface irregularity on the film by phase transformation of polypropylene β-crystal into α-crystal, leading to improved slipperiness without substantial use of inorganic or organic anti-blocking agents. Unfortunately, the film consists of homopolypropylene with high stereoregularity and thus has hard surface, and adhesion with a thin layer or a coating layer after processing such as vapor deposition, coating, or lamination, is not considered.

In contrast, PTL2 discloses a method for increasing adhesion in lamination with inks or other films through formation of irregularity on the surface of the film containing as little antistatic agents as possible.

However, barrier properties and processability after formation of thin layers by vapor deposition or coating are highly required.

CITATION LIST

Patent Literature

PTL1: WO-A-2007-094072
PTL2: WO-A-2018-142983

SUMMARY OF THE INVENTION

Problems to be Solved by the Invention

It is an object of the present invention to provide a biaxially-oriented polypropylene film, without spoiling high transparency and excellent mechanical properties inherent in the film, having high adhesion with a vapor deposited layer, a coating layer, or an adhesive for lamination with other films, and having high slipperiness and roll-up quality in processing.

Solution to the Problems

The present invention which solved the above problems is a biaxially-oriented polypropylene film, comprising
a base layer (A) comprising a polypropylene resin as a main component,
a surface layer (B) provided at one side of the base layer (A), and
a surface layer (C) provided at one side of the base layer (A) opposite to the surface layer (B), wherein the surface layer (B) satisfies the following (1) to (5) and the surface layer (C) satisfies the following (6) and (7):
(1) the surface layer (B) has a wetting tension of 38 mN or more;
(2) the surface layer (B) has a surface resistance value of 14.0 Log&2 or more;
(3) the surface layer (B) has an arithmetic average roughness (Ra) of 3.0 or more and 6.5 nm or less;
(4) the surface layer (B) has a Martens hardness of 248 N/mm$^2$ or less;
(5) the surface layer (B) has a center plane average surface roughness (SRa) of 0.010 or more and 0.026 μm or less;
(6) the surface layer (C) has a center plane average surface roughness (SRa) of 0.020 μm or more;
(7) the surface layer (C) has a Martens hardness of 270 N/mm$^2$ or more.
In the preferable embodiment, the biaxially-oriented polypropylene film has a dynamic friction coefficient of 0.6 or less.

Also, in the preferable embodiment, the biaxially-oriented polypropylene film has a haze value of 5% or less.

Further, in the preferable embodiment, the surface layer (B) has a maximum profile peak height Rp+a maximum profile valley depth Rv of 30 or more and 50 nm or less.

Furthermore, in the preferable embodiment, the biaxially-oriented polypropylene film has a degassing time required for adhering overlapped films of 10 seconds or less.

Furthermore, in the preferable embodiment, the biaxially-oriented polypropylene film has a thickness of 9 μm or more and 200 μm or less.

Furthermore, in the preferable embodiment, a laminate, comprising the biaxially-oriented polypropylene film and an unstretched polyethylene film is preferable.

Furthermore, in the preferable embodiment, the laminate has a laminate strength of 2.0 g/15 mm or more.

Advantageous Effects of the Invention

The biaxially-oriented polypropylene film of the present invention has high adhesion with a thin layer, a coating layer, or other films after vapor deposition, coating, or lamination with other films, and high slipperiness and high blocking resistance, without spoiling high transparency and excellent mechanical properties inherent in the film, therefore, the film is suitable for films to be processed.

BRIEF DESCRIPTION OF DRAWING

FIG. 1 is a schematic diagram illustrating an apparatus for the measurement of degassing time required for adhering overlapped films (seconds), and setting of the sample film.

DESCRIPTION OF EMBODIMENTS

The biaxially-oriented polypropylene film of the present invention, comprises
- a base layer (A) comprising a polypropylene resin as a main component,
- a surface layer (B) provided at one side of the base layer (A), and
- a surface layer (C) provided at one side of the base layer (A) opposite to the surface layer (B), wherein the surface layer (B) preferably satisfies the following (1) to (5) and the surface layer (C) preferably satisfies the following (6) and (7):
(1) the surface layer (B) has a wetting tension of 38 mN or more;
(2) the surface layer (B) has a surface resistance value of 14.0 Log Ω or more;
(3) the surface layer (B) has an arithmetic average roughness (Ra) of 3.0 or more and 6.5 nm or less;
(4) the surface layer (B) has a Martens hardness of 248 N/mm$^2$ or less;
(5) the surface layer (B) has a center plane average surface roughness (SRa) of 0.010 or more and 0.026 μm or less;
(6) the surface layer (C) has a center plane average surface roughness (SRa) of 0.020 μm or more;
(7) the surface layer (C) has a Martens hardness of 270 N/mm$^2$ or more.

The wetting tension of the surface layer (B) indicates the numerical value of surface tension (mN/m) of a mixed liquid for testing judged to be able to wet the surface of the film, and is related to wettability of printing inks or adhesives.

The value of the surface resistance of the surface of the surface layer (B) reflects the amount of antistatic agents on the surface. The value of the surface resistance increases as the quantity of the antistatic agents on the surface decreases.

The arithmetic average roughness (Ra) of the surface of the surface layer (B) is determined by a corrected image (tilt, line fitting, noise line removal) measured by a scanning probe microscopy (AFM) in a dynamic mode within a range of 2 μm of measurement length in both X and Y directions in accordance with the definition of the arithmetic average roughness described in JIS-B0601 (1994).

The arithmetic average roughness (Ra) in the range of 2 μm square measured by AFM is an index of irregularity of resin itself except for relatively large peaks and valleys formed by anti-blocking agents or lubricants, and is related to adhesion of the resins in processing involving vapor deposition, coating, or lamination. Large Ra indicates that the surface has high irregularity and resins can adhere with large surface area in processing, enabling adhesive strength to be improved. That is different from the maximum profile peak height Rp+the maximum profile valley depth Rv described later.

The Martens hardness of the surfaces of the surface layer (B) and the surface layer (C) indicates the hardness of resins measured by a dynamic ultra-micro hardness tester while being pushed on their surface by about 0.1 μm depth with a needle tip having a radius of curvature of 0.1 μm or less.

Low Martens hardness of the surface layer (B) indicates that the surface is soft and has high followability of the resin surface in processing, leading to improved adhesive strength. High Martens hardness of the surface layer (C) indicates that the surface is hard and the convexities formed by anti-blocking agents or lubricants sink a little, enabling the slipperiness and the blocking resistance to be improved with its contact area remained small.

The center plane average surface roughness (SRa) of the surfaces of the surface layer (B) and the surface layer (C) is measured by a three-dimensional roughness meter with a needle pressure of 20 mg, a measurement length in the X direction of 1 mm, feeding pitch in the Y direction of 2 μm, 99 lines recorded, magnification in the height direction of x20000, and cutoff of 80 μm, and is determined in accordance with the definition of arithmetic average roughness described in JIS-B0601 (1994).

The center plane average surface roughness (SRa) is an index of the surface irregularity including relatively large peaks and valleys formed by anti-blocking agents or lubricants, and is related to slipperiness of the film, wrinkles on a roll, and blocking of the films. Large SRa indicates that the surfaces have high irregularity and can contact with small surface areas in blocking between the films or slipping with metals, leading to improved slipperiness and blocking resistance.

(1) Base Layer (A)

The base layer (A) of the biaxially-oriented polypropylene film of the present invention may have a polypropylene resin such as a polypropylene homopolymer comprising no copolymerization components, or a polypropylene copolymer with 0.5 mol % or less of copolymerization components composed of ethylene and/or a olefin having 4 or more carbon atoms. The amount of the copolymerization components is preferably 0.3 mol % or less, more preferably 0.1 mol % or less, and a polypropylene homopolymer with no copolymerization components is the most preferable.

The amount of the copolymerization components composed of ethylene and/or α-olefin having 4 or more carbon atoms of 0.5 mol % or less keeps crystallinity and stiffness from being decreased, hence, the heat shrinkage ratio will be barely increased at high temperature. These resins may be blended for use.

The polypropylene resin forming the base layer (A) of the biaxially-oriented polypropylene film of the present invention has mesopentad fraction ([mmmm] %), which is an index of stereoregularity and measured by $^{13}$C-NMR, of preferably 98% or more and 99.5% or less, more preferably 98.1% or more, and further preferably 98.2% or more. Low mesopentad fraction of the polypropylene resin will decrease elastic modulus and cause insufficient heat resistance. Practically, the upper limit is 99.5%.

The polypropylene resin forming the base layer (A) of the biaxially-oriented polypropylene film of the present invention has mass average molecular weight (Mw) of preferably 180,000 or more and 500,000 or less.

In case where Mw is less than 180,000, the resin will not be stable during casting due to its low melt viscosity, resulting in poor film formation. In case where Mw is more than 500,000, the amount of components with a molecular weight of 100,000 or less becomes 35 mass %, resulting in reduced heat-shrinkage ratio at high temperature.

The lower limit of Mw is more preferably 190,000, and further preferably 200,000. The upper limit is more preferably 320,000, further preferably 300,000, and particularly preferably 250,000.

The polypropylene resin forming the base layer (A) of the biaxially-oriented polypropylene film of the present invention has number average molecular weight (Mn) of preferably 20,000 or more and 200,000 or less.

In case where Mn is less than 20,000, the resin may not be stable during casting due to its low melt viscosity, resulting in poor film formation. In case where Mn is more than 200,000, the heat-shrinkage ratio at high temperature will be reduced.

The lower limit of Mn is more preferably 30,000, further preferably, 40,000, and particularly preferably 50,000. The upper limit is more preferably 80,000, further preferably 70,000, and particularly preferably 60,000.

The polypropylene resin forming the base layer (A) has Mw/Mn, which is an index of molecular weight distribution, of preferably 2.8 or more and 10 or less. Mw/Mn is more preferably 2.8 or more and 8 or less, further preferably 2.8 or more and 6 or less, and particularly preferably 2.8 or more and 5.4 or less. The lower limit of Mw/Mn is preferably 3 or more, and more preferably 3.3 or more.

Molecular weight distribution of the polypropylene resin can be controlled by polymerization of the components having different molecular weight in a series of multi-stage plants; by blending components having different molecular weight off-line in a kneader; by polymerization with blended catalysts of different performances; or by catalyst which can contribute to attain desired molecular weight distribution.

The polypropylene resin forming the base layer (A) of the biaxially-oriented polypropylene film of the present invention has a melt flow rate (MFR; 230° C. 2.16 kgf) of preferably 2 g/10 mins or more and 20 g/10 mins or less in case where Mw/Mn is from 2.8 or more and 5.4 or less.

The lower limit of MFR of the polypropylene resin forming the base layer (A) is more preferably 3 g/10 mins, further preferably 4 g/10 mins, and particularly preferably 5 g/10 mins. The upper limit of MFR of the polypropylene resin forming the base layer (A) is more preferably 15 g/10 mins, and further preferably 12 g/10 mins.

Control of Mw/Mn and MFR of the polypropylene resin forming the base layer (A) within the range enables the heat shrinkage ratio at high temperature to be kept small, and imparts high film formability by improving adhesion to a cooling roll.

(2) Surface Layer (B)

The surface of the surface layer (B) of the biaxially-oriented polypropylene film of the present invention has the arithmetic average roughness (Ra) of preferably 3.0 or more and 5.5 nm or less. The arithmetic average roughness (Ra) of less than 3.0 nm reduces the surface area of the surface layer (B), resulting in decreased adhesive strength in processing such as vapor deposition, coating, or lamination. The arithmetic average roughness (Ra) of more than 5.5 nm increases surface irregularity and thus causes omission in vapor deposition or coating, resulting in inferior barrier properties.

The arithmetic average roughness (Ra) of the surface of the surface layer (B) is more preferably 3.2 nm or more, further preferably 3.3 nm or more, particularly preferably 3.5 nm or more, and the most preferably 4.0 nm or more.

For controlling the surface of the surface layer (B) to have the arithmetic average roughness (Ra) of 3.0 or more and 5.5 nm or less, the surface layer (B) preferably comprises a mixture of two or more different polypropylene resins with different melt flow rate (MFR) as a polypropylene resin composition forming surface layer (B). In this case, the difference in MFR is preferably 3 g/10 mins or more, and more preferably 3.5 g/10 mins or more.

The difference in melt flow rate (MFR) of the two or more polypropylene resins in the polypropylene resin mixture will presumably lead to difference in crystallization speed or degree of crystallization of each polypropylene resin, resulting in enhanced formation of irregularity on the surface. However, high degree of crystallization of the polypropylene resin and low cooling speed of an unstretched sheet during film production will lead to increased surface irregularity due to spherocrystals, or lead to increased surface irregularity due to high stretching temperature during stretching in the longitudinal or width direction, resulting in the arithmetic average roughness (Ra) of more than 5.5 nm. Attentions should be paid to this phenomenon.

The polypropylene resin with lower MFR may be a polypropylene copolymer with copolymerization component composed of ethylene and/or a olefin having 4 or more carbon atoms. Examples of the α-olefin having 4 or more carbon atoms include 1-butene, 1-hexene, 4-methyl-1-pentene, 1-octene. The polypropylene resin may comprise other copolymerization components such as maleic acid with polarity.

The amount of ethylene and/or d'olefin having 4 or more carbon atoms and other copolymerization components is preferably 8.0 mol % or less in total. The copolymerization with more than 8.0 mol % leads poor appearance of the film by being whitened, or the film may become sticky enough to prevent film formation.

Two or more of these resins may be blended. Each of the resins for blending may be copolymerized in an amount of more than 8.0 mol %, however, the blended resin preferably comprises monomers other than propylene in an amount of 8.0 mol % or less by monomer unit.

The polypropylene resins with higher MFR may be the copolymerized polypropylene or homo-polypropylene resin.

The polypropylene resin with lower MFR and the polypropylene resin with higher MFR can be blended at the ratio of 1 wt %/99 wt % to 49 wt %/51 wt %, more preferably 1 wt %/99 wt % to 30 wt %/70 wt %, and further preferably 1 wt %/99 wt % to 10 wt %/90 wt %.

The polypropylene resin composition forming the surface layer (B) of the biaxially-oriented polypropylene film of the present invention has MFR of preferably 1.0 g/10 mins or more and 10.0 g/10 mins or less. The lower limit of MFR of the polypropylene resin composition forming the surface layer (B) is more preferably 2.0 g/10 mins, further preferably 3.0 g/10 mins, and particularly preferably 4.0 g/10 mins. The upper limit of MFR of the polypropylene resin composition forming the surface layer (B) is more preferably 9.0 g/10 mins, further preferably 8.0 g/10 mins, and particularly preferably 5.5 g/10 mins. MFR within the range enables high film formability and imparts excellent appearance. In case where the polypropylene resin composition forming the base layer (A) has high MFR, the polypropylene resin composition forming the surface layer (B) with MFR of less than 1.0 g/10 mins results in large difference in viscosity between the base layer (A) and the surface layer (B). That leads to easy occurrence of unevenness of the film during film formation. The polypropylene resin composition forming the surface layer (B) with MFR of more than 10 g/10 mins will lower the adhesion to a cooling roll with the occurrence of air entrapment and lowered smoothness, leading to more defects resulting from them.

The surface of the surface layer (B) of the biaxially-oriented polypropylene film has the center plane average surface roughness (SRa) measured by a three-dimensional roughness gauge of preferably 0.010 μm or more and 0.026 μm or less. The center plane average surface roughness (SRa) of the surface of the surface layer (B) is more preferably 0.012 µm or more and 0.025 µm or less, further preferably 0.015 µm or more and 0.025 µm or less, and particularly preferably 0.020 µm or more and 0.024 µm or less. The center plane average surface roughness (SRa) of the surface of the surface layer (B) of less than 0.010 µm decreases surface irregularity, disadvantageously leading to low slipperiness of the film, undesirable degassing time required for adhering overlapped films, and poor blocking resistance. The center plane average surface roughness (SRa) of the surface of the surface layer (B) of more than 0.026 µm causes penetration of anti-blocking agents through a thin layer, or non-formation of a thin layer on convex sides of anti-blocking agents during aluminum vapor deposition or coating, resulting in low barrier properties and low adhesion. The center plane average surface roughness (SRa) of the surface of the surface layer (B) can be controlled within a predetermined range by some methods including adjustment of an average particle size or the amount of anti-blocking agents.

Anti-blocking agents can be selected from inorganic particles such as silica, calcium carbonate, kaolin, and zeolite, and organic particles such as acrylic type, polymethacrylate type, and polystyrene type, if needed. Silica and polymethacrylate type of particles are particularly preferable among them. The anti-blocking agents has the average particle size of preferably 1.0 µm or more and 3.0 µm or less, and more preferably 1.0 µm or more and 2.7 µm or less. The average particle size is the mean Feret's diameter determined by photographing the particles by a scanning electron microscopy followed by measurement with an image analyzer device in a horizontal direction.

The amount of anti-blocking agents in the surface layer (B) and the surface layer (C) is not particularly limited, and can be controlled so that the haze value, the dynamic friction coefficient, the center plane average surface roughness (SRa), and the degassing time required for adhering overlapped films become within a predetermined range.

The surface of the surface layer (B) of the biaxially-oriented polypropylene film of the present invention has the surface resistance value of preferably 14 Log Ω or more. The surface resistance value of 14 Log Ω or more improves adhesion with vapor deposited layer, coating layer, or an adhesive. The surface resistance value is more preferably 14.5 Log Ω or more, and further preferably 15 Log Ω or more. The surface resistance value of less than 14 Log Ω decreases adhesive strength, and also generates repelling of coating caused by antistatic agent bleeding out on the surface layer (B), resulting in defective coating. In order to control the surface resistance value to 14 Log Ω or more, additives such as antistatic agents or antifogging agents should be contained as little as possible. The additives contained in the base layer (A) may bleed out on the surface of the surface layer (B), attentions should be paid to this phenomenon.

The surface of the surface layer (B) of the biaxially-oriented polypropylene film of the present invention has the wetting tension of preferably 38 mN/m or more. The wetting tension of 38 mN/m or more improves adhesion with a vapor deposited layer, a coating layer, or an adhesive for lamination with other films. The wetting tension is normally controlled to 38 mN/m or more by additives such as antistatic agents or surfactants, however, these additives decrease the surface resistance value. Therefore, physicochemical surface treatments such as corona treatment or flame treatment are preferably conducted.

For example, corona treatment is conducted preferably involving discharging in air with a preheating roll and a treatment roll.

The surface layer (B) of the biaxially-oriented polypropylene film of the present invention has the Martens hardness of preferably 248 N/mm$^2$ or less, more preferably 245 N/mm$^2$ or less, further preferably 240 N/mm$^2$ or less, particularly preferably 235 N/mm$^2$ or less, and the most preferably 230 N/mm$^2$ or less.

The Martens hardness of more than 248 N/mm$^2$ increases the surface hardness and thus causes low followability of resin surface during processing, resulting in decreased adhesive strength. The Martens hardness can be controlled to 248 N/mm$^2$ or less by comprising ethylene and/or α olefin having 4 or more carbon atoms or other copolymerization components. In addition, the Martens hardness can be decreased by lowering the orientation of molecular chains through reducing the stretching ratio of the film.

The surface layer (B) of the biaxially-oriented polypropylene film of the present invention has the Martens hardness of preferably 200 N/mm$^2$ or more, and more preferably 210 N/mm$^2$ or more.

The surface of the surface layer (B) of the biaxially-oriented polypropylene film of the present invention has the maximum profile peak height Rp+maximum profile valley depth Rv measured by AFM of preferably 30 or more and 50 nm or less. The surface of the surface layer (B) has the lower limit of the maximum profile peak height Rp+maximum profile valley depth Rv of more preferably 32 nm, further preferably 35 nm, and particularly preferably 38 nm. The surface of the surface layer (B) has the upper limit of maximum profile peak height Rp+maximum profile valley depth Rv of further preferably 48 nm, and particularly preferably 45 nm. The maximum profile peak height Rp and the maximum profile valley depth Rv indicates irregularity by resin itself not by anti blocking agents. The maximum profile peak height Rp+maximum profile valley depth Rv of 30 nm or more will improve degassing from and blocking resistance of the surface layer (B) and the surface layer (C) contacted each other in a roll state. In addition, the surface area of the surface layer (B) will be increased, leading to improved adhesion with a vapor deposited layer and a coating layer.

The degassing properties and the blocking resistance are highly related to the center plane average surface roughness (SRa) measured by a three-dimensional roughness gauge, which will be described later. Therefore, a large center plane average surface roughness (SRa) of the surface layer (B) and the surface layer (C) may allow the film to have high degassing properties and high blocking resistance even in case where the maximum profile peak height Rp and the maximum profile valley depth Rv is less than 30 nm. The maximum profile peak height Rp+maximum profile valley depth Rv of 60 nm or less leads to not too high surface irregularity and thus enables less omission of the vapor deposited layer and coating layer, resulting in improved barrier properties.

(3) Surface Layer (C)

The surface of the surface layer (C) of the biaxially-oriented polypropylene film of the present invention has the center plane average surface roughness (SRa) measured by a three-dimensional roughness gauge of preferably 0.020 µm or more. The center plane average surface roughness (SRa) of the surface of the surface layer (C) is more preferably 0.022 µm or more, further preferably 0.025 µm, and particularly preferably 0.028 µm.

The center plane average surface roughness (SRa) of the surface of the surface layer (C) of less than 0.020 μm decreases surface irregularity, resulting in low film slipperiness, unfavorable degassing time required for adhering overlapped films, and low blocking resistance. The center plane average surface roughness (SRa) of the surface of the surface layer (C) can be controlled within a predetermined range by some methods including adjustment of an average particle size or the amount of anti-blocking agents.

The surface of the surface layer (C) of the biaxially-oriented polypropylene film of the present invention has the center plane average surface roughness (SRa) by a three-dimensional roughness gauge of preferably 0.040 μm or less.

The surface layer (C) of the biaxially-oriented polypropylene film has the Martens hardness of preferably 270 N/mm$^2$ or more, more preferably 275 N/mm$^2$ or more, further preferably 280 N/mm$^2$ or more, and particularly preferably 285 N/mm$^2$ or more.

The Martens hardness of less than 270 N/mm$^2$ leads to soft surface and thus causes sinking of anti-blocking agents into the inside of the resin, leading to low slipperiness and poor blocking resistance. The Martens hardness can be controlled to 270 N/mm$^2$ or more preferably by comprising polypropylene copolymer with 0.5 mol % or less of copolymerization components composed of ethylene and/or a olefin having 4 or more carbon atoms, more preferably with 0.1 mol % or less, and homo-polypropylene with no copolymerization component is the most preferable. The Martens hardness can be improved by increasing degree of crystallization through controlling the mesopentad fraction ([mmmm] %) of the polypropylene forming the surface layer (C) to 98% or more.

The surface layer (C) of the biaxially-oriented polypropylene film has the Martens hardness of preferably 350 N/mm$^2$ or less.

The polypropylene resin in the present invention is produced through polymerization from propylene raw materials with conventional catalysts such as a Ziegler-Natta catalyst, a metallocene catalyst, and the like. The Ziegler Natta catalyst can eliminate heterophilic binding, and the catalysts which enable polymerization with high stereoregularity are preferable.

Conventional methods are employed for polymerization of propylene raw materials, and the methods include polymerization in inert solvents such as hexane, heptane, toluene, and xylene; polymerization in liquid monomers; polymerization in a gas phase state with the addition of a catalyst to gaseous monomers; or combinations thereof.

The base layer (A) and/or the surface layer (B) and/or the surface layer (C) of the biaxially-oriented polypropylene film of the present invention may comprise additives or other resins. Examples of the additives include antioxidants, UV absorbers, nucleating agents, adhesives, antifogging agents, flame retardants, and inorganic or organic fillers. Examples of other resins include polypropylene resins other than the polypropylene resins in the present invention, random copolymers by copolymerization of propylene and ethylene and/or α-olefin having 4 or more carbon atoms, various elastomers. These may be used by polymerizing sequentially by a multistage reactor, by blending with polypropylene resin by a Henschel mixer; by diluting with polypropylene so that a master pellet prepared in advance by a melt-kneader have predetermined concentration; or by melt-kneading whole amount in advance.

(3) Biaxially-Oriented Polypropylene Film

The biaxially oriented polypropylene film of the present invention has a layer structure exemplified by a three-layer structure of surface layer (B)/base layer (A)/surface layer (C); a four-layer structure of surface layer (B)/base layer (A)/intermediate layer (D)/surface layer (C); or multilayer structure having more than four layers of surface layer (B)/intermediate layer (D)/base layer (A)/intermediate layer (D)/surface layer (C).

The overall thickness of the biaxially-oriented polypropylene film of the present invention is preferably 9 μm or more and 200 μm or less, more preferably 10 μm or more and 150 μm or less, further preferably 12 μm or more and 100 μm or less, and particularly preferably 15 μm or more and 80 μm or less.

The biaxially-oriented polypropylene film of the present invention has the ratio of the thickness of the surface layer (B) to the thickness of the base layer (A) (overall thickness of surface layer (B)/overall thickness of base layer (A)) of preferably 0.01 or more and 0.50 or less, more preferably 0.02 or more and 0.40 or less, further preferably 0.03 or more and 0.30 or less, and particularly preferably 0.04 or more and 0.20 or less. The ratio of overall thickness of surface layer (B)/overall thickness of base layer (A) of more than 0.50 will increase the shrinkage ratio.

The biaxially-oriented polypropylene film of the present invention has the ratio of the thickness of the surface layer (C) to the thickness of the base layer (A) (overall thickness of surface layer (C)/overall thickness of base layer (A)) of preferably 0.01 or more and 0.50 or less, more preferably 0.02 or more and 0.40 or less, further preferably 0.03 or more and 0.30 or less, and particularly preferably 0.04 or more and 0.20 or less. The ratio of overall thickness of surface layer (C)/overall base layer (thickness of A) of more than 0.50 will increase haze value depending on the amount of anti-blocking agents, resulting in low transparency.

The thickness of the base layer (A) or the total thickness of the base layer (A) and the intermediate layer (D) to the overall thickness of the film is preferably 50% or more and 99% or less, further preferably 60% or more and 97% or less, particularly preferably 70% or more and 90% or less, and the most preferably 80% or more and 92% or less.

The biaxially oriented polypropylene film of the present invention has the haze value of preferably 5% or less, more preferably 0.2% or more and 5.0% or less, further preferably 0.3 or more and 4.5%, and particularly preferably 0.4% or more and 4.0%. The film with the haze value within the range will be more suitable for applications requiring transparency. The combination of too high stretching and heat fixing temperatures, a high temperature of a cooling roll accompanied by low cooling rate of an unstretched sheet (film before processing), and too high amount of low molecular weight components will cause the film to have undesirable haze value. The haze value becomes within the range by controlling these factors. Measurement method of the haze value will be described later.

The biaxially-oriented polypropylene film of the present invention has the tensile modulus in the longitudinal direction of preferably 1.8 or more and 4.0 GPa or less, more preferably 2.0 GPa or more and 3.7 GPa or less, further preferably 2.1 GPa or more and 3.5 GPa or less, and particularly preferably 2.2 or more and 3.4 GPa or less.

The biaxially-oriented polypropylene film of the present invention has the tensile modulus in the width direction of preferably 3.8 GPa or more and 8.0 GPa or more, more preferably 4.0 GPa or more and 7.5 GPa or less, further preferably 4.1 GPa or more and 7.0 GPa or less, and particularly preferably 4.2 GPa or more and 6.5 GPa or less. The tensile modulus within the range will impart enough firmness to the film to be used as a thin film, leading to reduced amount of film usage. The tensile modulus is measured by the method described later.

The biaxially-oriented polypropylene film of the present invention has the heat shrinkage ratio at 150° C. in the longitudinal direction of preferably 0.2 or more and 15.0% or less, more preferably 0.3% or more and 13.0% or less, further preferably 0.5% or more and 11.0% or less, and particularly preferably 0.5% or more and 9.0% or less. The heat shrinkage ratio within the range will impart high heat resistance to the film, enabling the film to be used in applications involving exposure to high temperature. The heat-shrinkage ratio at 150° C. can be controlled to around 1.5%, for example, by increasing low molecular weight components or by controlling stretching or heat fixing conditions. The ratio can be further lowered to 1.5% or less preferably by annealing treatment conducted off-line.

The biaxially-oriented polypropylene film of the present invention has the heat-shrinkage ratio at 150° C. in the width direction of preferably 0.5 or more and 30.0% or less, more preferably 0.5% or more and 25.0% or less, further preferably 0.5% or more and 20.0% or less, and particularly preferably 0.5% or more and 18.0% or less. The heat-shrinkage ratio within the range will impart high heat resistance to the film, enabling the film to be used in applications involving exposure to high temperature. The heat-shrinkage ratio at 150° C. can be controlled to around 1.5%, for example, by increasing low molecular weight components or by controlling stretching or heat fixing condition. The ratio can be further lowered to 1.5% or less preferably by annealing treatment conducted off-line. The heat shrinkage ratio is measured by the method described later.

The biaxially-oriented polypropylene film of the present invention has the dynamic friction coefficient of preferably 0.6 or less, more preferably 0.55 or less, and particularly preferably 0.50 or less. The dynamic friction coefficient of 0.6 or less will allow the film to be smoothly unwound from a roll film and thus enables facilitated printing processing. The dynamic friction coefficient may be 0.1 or more. The dynamic friction coefficient is measured by the method described later.

The biaxially oriented polypropylene film of the present invention has the degassing time required for adhering overlapped films of preferably 10 seconds or less, more preferably 8 seconds or less, further preferably 5 seconds or less, and particularly preferably 8 seconds or less. The degassing time of longer than 10 seconds slows degassing from the films made into a roll, causing wrinkles. The degassing time of the films may be 1 second or longer. The degassing time is measured by the method described later.

The present inventive biaxially-oriented polypropylene film that is wound as a film roll at least in the size of 300 mm in width and 800 m in winding length is preferable for transportation and processing such as vapor deposition, coating, and bag making.

The biaxially oriented polypropylene film of the invention is wound up as a roll with a width of 500 mm and a winding length of 1000 m, and is visually evaluated for wrinkles on the roll surface layers in accordance with the following criteria. Slight wrinkles which disappear by applying tension of around 20 N/m to the unwound film are acceptable, and the film has preferably no wrinkles.

The biaxially-oriented polypropylene film of the present invention will have improved gas barrier and design properties by comprising a layer, especially a thin layer, consisting of aluminum, polyvinylidene chloride, nylon, ethylene vinyl alcohol copolymer, or polyvinyl alcohol.

The aluminum thin layer on the surface of the biaxially-oriented polypropylene film of the present invention peels off preferably only partially, more preferably, the aluminum thin layer does not peel off even partially.

The coating layer on the surface of the biaxially-oriented polypropylene film is repelled preferably very slightly, more preferably, the coating layer is not repelled.

The biaxially-oriented polypropylene film of the present invention or the film provided with a thin layer will be laminated with an unstretched film, a uniaxially-oriented film, or a biaxially-oriented film consisting of a low density polyethylene, a linear low-density polyethylene, an ethylene-vinyl acetate copolymer, polypropylene, or polyester, and the laminate will be preferably made to a packaging bag.

The laminate strength of the biaxially-oriented polypropylene film of the present invention provided with the unstretched polyethylene film is preferably 2.0 N/15 mm or more, more preferably 2.3 N/mm or more, further preferably 2.5 N/mm or more, and particularly preferably 2.8 N/mm or more. The laminate strength may be 5 N/mm or less. The laminate strength is measured by the method described later.

(4) Production Method

In the production of the biaxially-oriented polypropylene film of the present invention, the polypropylene resin composition forming the base layer (A), the polypropylene resin composition forming the surface layer (B), and the polypropylene resin composition forming the surface layer (C) are melt extruded from different extruders, co-extruded from a die, and cooled on a cooling roll to form an unstretched sheet. Then, the unstretched sheet is stretched in the longitudinal (MD) and width (TD) directions, and heat fixed to form the biaxially-oriented polypropylene film. The unstretched sheet is preferably extruded so that the surface layer (B) becomes contacted with a cooling roll. In case where the surface layer (B) comes to the opposite side of the surface contacted with a cooling roll, slow cooling of the polypropylene resin leads to increased degree of crystallization, and the resultant surface irregularity due to spherocrystals causes too high arithmetic average roughness (Ra) of the surface of the surface layer (B).

The resins are melt-extruded preferably at a temperature of around 200 to 280° C. This temperature range requires a difference in viscosity (difference in MFR) preferably controlled to 6.0 g/10 mins or less between the polypropylene resin composition forming the base layer (A) and the polypropylene resin composition forming the surface layer (B) for producing a laminated film of good appearance without disordered layers. The difference in viscosity of more than 6 g/10 mins often leads to poor appearance of the film due to disordered layers. The difference in viscosity is more preferably 5.5 g/10 mins or less, and further preferably 5.0 g/10 mins or less.

The surface temperature of a cooling roll is preferably 25° C. or higher and 35° C. or lower, and more preferably 27° C. or higher and 33° C. or lower. The temperature of a cooling roll of higher than 35° C. will lead to increased degree of crystallization of the polypropylene resin and the resultant spherocrystals thus cause surface irregularity, resulting in too high arithmetic average roughness (Ra) of the surface of the surface layer (B).

The lower limit of the stretching-ratio in the longitudinal (MD) direction is preferably 3, and more preferably 3.5. The stretching-ratio of less than the range will cause thickness unevenness of the film. The upper limit of the stretching ratio in the MD direction is preferably 8, and more preferably 7. The stretching-ratio more than the range will make subsequent stretching in the TD direction difficult. The lower limit of the stretching temperature in the MD direction is preferably 120° C., more preferably 125° C., and further preferably 130° C. The stretching temperature lower than the range will increase mechanical overload or thickness unevenness, or cause surface roughness of the film. The upper limit of the stretching temperature in the MD direction is preferably 160° C., more preferably 155° C., and further preferably 150° C. Though a higher temperature is preferable to decrease the heat-shrinkage ratio, such a high temperature will cause the film to stick to a roll and thus prevents the film from being stretched, or will generate surface roughness.

The lower limit of the stretching-ratio in the width (TD) direction is preferably 4, more preferably 5, and further preferably 6. The stretching-ratio less than the range will cause thickness unevenness. The upper limit of the stretching-ratio in the TD direction is preferably 20, more preferably 17, further preferably 15, and particularly preferably 12. The stretching ratio more than the range will increase the heat-shrinkage ratio or cause breakage of the film during stretching. Preheating temperature for stretching in the TD direction is preferably controlled to 5 to 15° C. higher than the stretching temperature so that the film temperature can be promptly raised to a temperature near the stretching temperature. The lower limit of the stretching temperature in the TD direction is preferably 160° C., more preferably 165° C., further preferably 158° C., and particularly preferably 160° C. The stretching temperature lower than the range will cause breakage of the film due to insufficient softening, or increased heat-shrinkage ratio. The upper limit of the stretching temperature is preferably 170° C., more preferably 168° C., and further preferably 165° C. Though a higher stretching temperature in the TD direction is preferable to decrease the heat-shrinkage ratio, a temperature higher than the range will lead to not only a decrease in orientation by melting and recrystallization of low molecular weight components but also surface roughness and whitening of the film.

The film after stretching is heat fixed. The lower limit of the heat fixing temperature is preferably 163° C., and more preferably 165° C. The heat fixing temperature lower than the range will increase the heat-shrinkage ratio, or may require a treatment over a long period of time to decrease the heat-shrinkage ratio, leading to low productivity. The upper limit of the heat fixing temperature is preferably 176° C., and more preferably 175° C. Temperature higher than the range will cause melting and recrystallization of low molecular weight components, leading to surface roughness and whitening of the film.

The film is preferably relaxed during heat fixing. The lower limit of the relaxation rate is preferably 2%, and more preferably 3%. Relaxation rate less than the range may increase the heat shrinkage ratio. The upper limit of the relaxation rate is preferably 10%, and more preferably 8%. The relaxation rate more than the range will lead to increased thickness unevenness.

After the film produced in above process is once wound in a roll, the film can be further annealed off-line to decrease the heat shrinkage ratio.

Thus, produced biaxially-oriented polypropylene film is subjected to corona discharge, plasma treatment, or flame treatment, if needed, and after that, the film is wound by a winder to produce the biaxially-oriented polypropylene film roll of the present invention.

EXAMPLES

Hereinafter, the present invention will be described in more detail with Examples, however, the present invention should not be limited by Examples. The present invention can be carried out with modifications in the range not departing from the scope of the present invention, and the invention with the modifications is included to the present invention.

(Measurement Methods)

The followings are measurement methods for raw materials used in Examples and Comparative Examples, and physical properties of the films.

1) Mesopentad Fraction ([mmmm] Unit: %)

The mesopentad fraction was measured by BC-NMR with "AVANCE500" manufactured by BRUKER, and calculated according to the method described in Zambelli et. al., Macromolecules, Vol. 6, p925 (1973). The sample (200 mg) was dissolved at 135° C. into a mixed solution of o-dichlorobenzene and hexadeuterobenzene (8:2, volume ratio), and measured at 110° C.

2) Melt Flow Rate ([MFR] g/10 mins)

Melt flow rate (MFR) was measured at 230° C. with a load of 2.16 kgf in accordance with JIS K 7210.

In case where a sample was a resin raw material, required amount of pellet or powder was weighed.

In case where a sample was a film, required amount of the film was cut out for further cutting to a square with a side of 5 mm.

3) Molecular Weight and Molecular Weight Distribution

The molecular weight and the molecular weight distribution of the resin raw material and the film were measured by gel permeation chromatography (GPC) and determined on the basis of a monodispersed polystyrene. Measurement conditions of a column, solvent, and the like for GPC measurement are as follows.

Solvent: 1,2,4-Trichlorobenzene
Column: TSKgel GMHHR-H(20) HT×3
Flow rate: 1.0 ml/min
Detector: RI
Measurement temperature: 140° C.

Number average molecular weight (Mn), mass average molecular weight (Mw), and molecular weight distribution (Mw/Mn) are each defined by the following equations expressed by molecular weight ($M_i$) and numbers of molecule (No) at each elution point in the GPC curve derived through molecular weight calibration curve.

Number average molecular weight: $Mn=\Sigma(N_i \cdot M_i)/\Sigma N_i$
Mass average molecular weight: $Mw=\Sigma(N_i \cdot M_i^2)/\Sigma(N_i \cdot M_i)$
Molecular weight distribution: Mw/Mn An unclear baseline was replaced with a baseline determined within a range broaden to the lowest position of high molecular side skirt of the elution peak, which is in high molecular side and closest to the elution peak of a standard substance.

4) Temperature of Melting Peak (° C.) and Melting Peak Area (J/g)

Measurement was conducted with a sample (10 mg) at a temperature rising rate of 20° C./min by a differential scanning calorimetry (DSC) manufactured by SII. The temperature of melting endothermic peak and the melting peak area were determined from a DSC curve.

5) Thickness (μm)

The biaxially-oriented polypropylene film was solidified with a modified urethane resin to cut out sections with a microtome. The sections were observed with a differential interference contrast microscopy to determine the thickness of the base layer (A) and the surface layer (B).

6) Haze Value (%)

The haze value was measured at 23° C. by a haze meter (300A, manufactured by NIPPON DENSHOKU INDUS- TRIES CO., LTD.) in accordance with JIS K 7105. The measurement was conducted 2 times, and the average value was calculated.

7) Tensile Modulus (GPa)

Measurement was conducted in accordance with JIS K 7127. Sample was cut out with a razor both in the longitudinal and the width directions of the film to the size of 10 mm in width and 180 mm in length. After the sample was placed in an atmosphere of 23° C. and 65% RH for 12 hours, measurement was conducted in an atmosphere of 23° C. and 65% RH with Autograph (AG5000A, manufactured by Shimadzu Corporation) under measurement conditions of a tensile speed of 200 mm/min and a distance between the chucks of 100 mm. Measurement was conducted 5 times, and the average value was determined as the tensile modulus.

8) Heat-Shrinkage Ratio (%)

Measurement was conducted by the following method in accordance with JIS Z 1712. Film was cut in each of the MD and the TD directions to the size of 20 mm in width and 200 mm in length, and the film was hung and heated for 5 minutes in a hot air oven set at 150° C. The length before and after the heating of the film was measured, and the ratio (%) of the difference in film length before and after heating to the length before heating was calculated to determine the heat-shrinkage ratio.

9) Wetting Tension (mN/m)

The corona-treated surface of the film was measured after aging at 23° C. and 50% RH for 24 hours by the following procedure in accordance with K 6768:1999.

Procedure 1)

Measurement is conducted in a standard test room atmosphere (refer to JIS K 7100) of 23° C. and 50% RH.

Procedure 2)

Test piece is placed on a substrate of a hand coater (4.1). Several drops of a mixed liquid for testing are put onto the test piece and are immediately spread with a wire bar.

The mixed liquid for testing can be spread with a swab or a brush, rapidly to have an area of at least 6 cm² or more. The amount of the liquid should be enough to form a thin layer without forming a pool.

Liquid layer of the mixed liquid for testing is observed in a well-lit place and the wetting tension is judged from the liquid layer state after 3 seconds. The liquid layer keeping its first wetting state for 3 seconds or more without rupture is judged to be wet. In case where the wetting state is kept for 3 seconds or more, further, a next mixed liquid with higher surface tension is applied. Conversely, in case where the liquid layer breaks in 3 seconds or less, a next mixed liquid with lower surface tension is applied.

This operation is repeated to select a mixed liquid capable of wetting the surface of the test piece accurately at 3 seconds.

Procedure 3)

New swab is used for each measurement. Since the surface tension and the composition of the mixed liquid for testing is changed by evaporation of the residual liquid, a brush and a wire bar are washed with methanol and dried for every use.

Procedure 4)

This selection of the mixed liquid for testing, which is capable of wetting the surface of the test piece for 3 seconds, is conducted at least 3 times. The surface tension of thus selected mixed liquid for testing is determined as the wetting tension of the film.

10) Surface Resistance Value (Log Ω)

After the aging of the film at 23° C. for 24 hours, the surface layer (B) of the film was measured in accordance with JIS K6911.

11) Dynamic Friction Coefficient

The surface layers (B) of two films were stacked and measured at 23° C. in accordance with JIS K 7125.

12) Degassing Time Required for Adhering Overlapped Films (Seconds)

Referring to FIG. 1, the biaxially-oriented polypropylene film as a film 4 is placed on a base platform 1 so that the surface layer (B) becomes the upper surface. Next, a film holddown 2 is placed on the top of the film 4, and the film 4 is fixed while being applied tension by fixing. Next, the biaxially-oriented polypropylene film as a film 5 is placed on a film holddown 2 with the surface layer (C) downward. Then, a film holddown 8 is placed on the film 5, and the film holddown 8, the film holddown 2, and the platform 1 are fixed each other with a screw 3.

An opening 2a formed in the film holddown 2 is connected to a vacuum pump 6 through a pipe 7 and a pore 2c formed in the film holddown 2. The film 5 is applied tension through sticking of the film to the opening 2a, which is caused by driving of the vacuum pump 6. At the same time, the overlapped surfaces of the film 4 and the film 5 are also depressurized through a pore 2d formed circumferentially in the film holddown 2, enabling the film 4 and the film 5 to start to adhere each other from a periphery of the overlapped surfaces.

The state of adhesion can be easily known by observing interference fringes from the top of the overlapped surfaces. The degassing time required for adhering overlapped films (seconds) is determined by measuring the time taken for the interference fringes to appear at the outer periphery of the overlapped surfaces of the film 4 and the film 5 and stop moving after spreading to the front of the overlapped surfaces (seconds). The measurement is repeated 5 times by replacing the two films for each measurement, and the average value is determined. The film with shorter degassing time (seconds) has better winding properties.

13) Martens Hardness HMs (N/mm²)

The film was cut to a square of around 2 cm. The surface of the film, which is opposite to the surface for measurement, was fixed with an adhesive on a glass plate having a thickness of around 1 mm. After that, the film was placed in an atmosphere of 23° C. and 50% RH for 12 hours for humidity controlling. The sample was measured by dynamic ultra micro hardness tester (DUH-211, manufactured by Shimadzu Corporation) by a method in accordance with ISO14577-1 (2002) under the following measurement conditions. The measurement was conducted 10 times by changing measurement positions on the film. The average of the measurement values of 8 points except for the maximum value and the minimum value was determined.

<Measurement Conditions>

Settings

Measurement environment: temperature of 23° C., relative humidity of 50%

Test mode: loading-unloading test.

Indenter used: intercristal angle of 115°, a triangular pyramid indenter made of diamond Elastic modulus of indenter: 1.140×106 N/mm²

Poisson's ratio of indenter: 0.07

Cf-Ap, As correction: with correction

Conditions

Test force: 0.10 mN

Loading speed: 0.0050 mN/sec

Loading retention time: 5 sec

Unloading retention time: 0 sec

The Martens hardness was calculated from a slope (m), in which the depth between the test force of 50% F and 90% F (F=0.10 mN) was proportional to a square root of the test force in a test force-indentation depth curve, according to the following Equation (1).

$$\text{Martens hardness HMs}=1/(26.43\times m^2) \quad (1)$$

14) Center Plane Average Surface Roughness ([SRa]μm)

The center plane average surface roughness (SRa) of thus produced film was measured with a three-dimensional roughness meter (model number: ET-30HK, manufactured by Kosaka Laboratory Ltd.). Measurement was conducted with a needle pressure of 20 mg and a measurement length in the X direction of 1 mm, feeding pitch in the Y direction of 2 μm, 99 lines recorded, and cut off of 80 μm, at feeding speed of 100 μm/second and magnification in the height direction of x20000. The center plane average surface roughness was calculated in accordance with the definition of the arithmetic average roughness described in JIS-B0601 (1994).

The arithmetic average roughness (SRa) was measured 3 times per sample, and was evaluated on the average value.

15) Arithmetic Average Roughness ([Ra] Nm), Maximum Profile Peak Height ([Rp] Nm), and Maximum Profile Valley Depth ([Rv] Nm)

The arithmetic average roughness (Ra), the maximum profile peak height (Rp), and the maximum profile valley depth (Rv) of the film were measured with a scanning probe microscopy (SPM-9700, manufactured by Shimadzu Corporation). The measurement was conducted in a dynamic mode over a range of 2 μm of measurement length in the X and Y directions, and the obtained images were corrected (tilt, line fitting, noise line removal). After that, Ra, Rp, and Rv were determined in accordance with the definition of the arithmetic average roughness described in JIS-B0601 (1994).

16) Laminate Strength (N/15 mm)

The laminate strength was measured by the procedures described below.

Procedure 1) Preparation of Laminate of Biaxially-Oriented Polypropylene Film and Unstretched Polyethylene Film The laminate was prepared as follows with a continuous dry laminating machine.

The surface layers (B) of the biaxially-oriented polypropylene films produced in Examples and Comparative Examples were coated with an adhesive by gravure coating so that the amount of the adhesive when dried became 2.8 g/m². After that, the films were introduced to a drying zone and dried at 80° C. for 5 seconds. Subsequently, each film was laminated with a sealant film between rolls provided in a downstream (roll pressure: 0.2 MPa, roll temperature: 50° C.). Thus, produced laminated film was subjected to an aging treatment at 40° C. for 3 days in wound state.

The adhesive was a urethane adhesive containing a mixture mixing 28.9 mass % of main agent (TM569, manufactured by Toyo-Morton, Ltd.), 4.00 mass % of curing agent (CAT10L, manufactured by Toyo-Morton, Ltd.), and 67.1 mass % of ethyl acetate. The sealant film was an unstretched polyethylene film manufactured by TOYOBO CO., LTD. (LIX (registered trademark) L4102, thickness: 40 μm).

Procedure 2) Measurement of Laminate Strength

Thus, produced laminated film was cut into strips having its longer side in the longitudinal direction of the biaxially oriented polypropylene film (length: 200 mm, width: 15 mm). T peel strength (N/15 mm) of the film was measured by a tensile tester (TENSILON, manufactured by ORIENTEC CORPORATION) at a tensile speed of 200 mm/min in an environment of 23° C. Measurement was conducted 3 times, and the average was determined as the laminate strength.

17) Evaluation of Wrinkles on Film Roll

The biaxially-oriented polypropylene film after film formation was wound up as a roll of 500 mm in width and 1000 m in winding length, and wrinkles on the surface layers of the roll was evaluated by visual check in accordance with the criteria described below. The film judged to be good or fair was acceptable.

Good: without wrinkles

Fair: with slight wrinkles, however, the wrinkles disappear by applying tension of around 20 N/m to the unwound film.

Bad: with thick wrinkles, and the wrinkles do not disappear even by applying tension of around 20 N/m to the unwound film.

18) Evaluation of Coating Suitability

Butanediol vinyl alcohol copolymer (Nichigo G-Polymer OKS-8049, manufactured by The Nippon Synthetic Chemical Industry Co., Ltd.) was dissolved in 15% aqueous solution of isopropyl alcohol to prepare a coating liquid of a solid component concentration of 5%. The coating liquid was dripped onto the surface layer (B) of the film, and the surface was coated with a meyer bar #3 so that the amount of the coating became 0.2 g/m² when dried. After that, the solution was sufficiently volatilized with a dryer, and repelling of the coating layer was visually evaluated. The coating layer judged to be excellent or good was acceptable.

Excellent: without repelling of coating layer.

Good: with repelling of coating not 90%, a very small, slight repelling is found.

Bad: with partial repelling of coating layer, percentage of coating layer without repelling is less than 90%.

Very bad: with repelling of coating layer over entire surface layer

19) Adhesion Evaluation of Aluminum Vapor Deposited Layer

On the surface layer (B) of the film, an aluminum layer was vapor deposited with a small vacuum deposition apparatus (VWR-400/ERH, manufactured by ULVAC KIKO, Inc.) so that the thickness of the deposited layer became 30 nm. Adhesion state of the aluminum vapor deposited layer was evaluated by 90° peeling method, in which Sellotape (registered trademark, manufactured by NICHIBAN CO., LTD.) having a width of 18 mm was applied to the surface of the vapor deposited layer. The aluminum vapor deposited layer judged to be good was acceptable.

Good: without peeling off of aluminum vapor deposited layer.

Bad: with partial peeling off of aluminum vapor deposited layer.

Very bad: with peeling off of aluminum vapor deposited layer over entire surface layer.

(Resin Raw Material)

Details of the polypropylene resin used in the following Examples and Comparative Examples, and conditions for film formation are shown in Tables 1 to 3.

TABLE 1

| Polypropylene resin | PP-1 | PP-2 | PP-3 | PP-4 |
|---|---|---|---|---|
| Monomer raw materials | Propylene | Propylene | Propylene, Ethylene | Propylene |
| Resin stereoregularity (mesopentad fraction (%)) | 98.4 | 98.7 | N/A | 98.9 |
| Copolymerization amount of ethylene (mol %) | 0.0 | 0.0 | 3.0 | 0.0 |
| MFR (g/10 mins, 230° C., 2.16 kgf) | 3.0 | 7.6 | 7.0 | 1.9 |
| Molecular weight (Mn) | 79,400 | 67,500 | 80,000 | 80,000 |
| Molecular weight (Mw) | 312,000 | 270,000 | 220,000 | 360,000 |
| Molecular weight distribution (Mw/Mn) | 3.9 | 4.0 | 2.7 | 4.5 |
| DSC melting peak temperature (° C.) | 163.9 | 168.0 | 125.3 | 163.3 |
| DSC melting peak area (J/g) | 98.6 | 105.2 | 64.3 | 94.3 |

TABLE 2

| Masterbatch | A | B |
|---|---|---|
| Product name of masterbatch | FTX0627G | MB77A |
| Anti-blocking agent in masterbatch | Silica particles | Polymethylmethacrylate particles |
| Average particle size of anti-blocking agent (μm) | 2.7 | 1.4 |
| Content of anti-blocking agent in masterbatch (ppm by weight) | 50000 | 200000 |
| MFR of polypropylene resin in masterbatch (g/10 mins, 230° C., 2.16 kgf) | 3.0 | 3.0 |

TABLE 3

| Condition for film formations | a | b | c |
|---|---|---|---|
| Molten resin temperature (° C.) | 250 | 250 | 250 |
| Cooling roll temperature (° C.) | 30 | 30 | 30 |
| Stretching-ratio in longitudinal direction (times) | 4.5 | 4.5 | 4.5 |
| Stretching temperature in longitudinal direction (° C.) | 125 | 135 | 125 |
| Stretching-ratio in width direction (times) | 8.2 | 8.2 | 8.2 |
| Preheating temperature of stretching in width direction (° C.) | 168 | 173 | 175 |
| Stretching temperature in width direction (° C.) | 155 | 164 | 166 |
| Heat fixing temperature (° C.) | 165 | 171 | 171 |
| Relaxation rate in width direction (%) | 6.7 | 6.7 | 6.7 |

Example 1

The base layer (A) was prepared from polypropylene homopolymer PP-1 shown in Table 1.

The surface layer (B) was prepared from polypropylene homopolymer PP-1 shown in Table 1, ethylene-copolymerized polypropylene polymer PP-3 shown in Table 1, and masterbatch A shown in Table 2, blended at a ratio of 43.2 wt %, 52.0 wt %, and 4.8 wt %, respectively. The polypropylene resin composition forming the surface layer (B) had a melt flow rate of 5.1 (g/10 mins).

The surface layer (C) was prepared from polypropylene homopolymer PP-1 shown in Table 1 and masterbatch A shown in Table 2 blended at a ratio of 93.6 wt % and 6.4 wt %, respectively.

The resin raw materials for the base layer (A), the surface layer (B), and the surface layer (C) were melted at 250° C. with an extruder of 45 mm, an extruder of 25 mm, and an extruder of 20 mm, respectively, co-extruded from a T-die into a sheet, and was solidified by cooling with the surface layer (B) being contacted with a cooling roll set at 30° C. After that, the sheet was stretched 4.5 times at 125° C. in the longitudinal (MD) direction. Then, in a tenter, the film was grasped by clips at both ends in the width (TD) direction of the film, preheated at 168° C., stretched by 8.2 times at 155° C. in the width (TD) direction, and heat fixed at 165° C. while being relaxed by 6.7% in the width (TD) direction. The conditions for film formation were defined as film formation condition a.

In this way, the biaxially oriented polypropylene film having a structure of surface layer (B)/base layer (A)/surface layer (C) was produced.

The surface of the surface layer (B) of the biaxially-oriented polypropylene film was subjected to corona treatment (applied current value: 0.75 A) by a corona surface treatment system (manufactured by SOFTAL Corona & Plasma GmbH), and the film was then wound up with a winder. Thickness of thus produced film was 20 μm (thickness: surface layer (B)/base layer (A)/surface layer (C): 1.3 μm/17.7 μm/1.0 μm).

Example 2

The biaxially-oriented polypropylene film was produced in the same manner as Example 1 except that the discharging rate of resins from extruders were changed so that the base layer (A) and the surface layer (B) have the thickness of 15.1 μm and 3.9 μm, respectively. Thickness of thus produced film was 20 μm.

Example 3

The biaxially-oriented polypropylene film was produced in the same manner as Example 1 except that the surface layer (B) was prepared from polypropylene homopolymer PP-1 shown in Table 1, ethylene-copolymerized polypropylene polymer PP-3 shown in Table 1, and masterbatch A shown in Table 2, blended at a ratio of 45.0 wt %, 52.0 wt %, and 3.0 wt %, respectively. Thickness of thus produced film was 20 μm.

Example 4

The biaxially-oriented polypropylene film was produced in the same manner as Example 1 except that the surface layer (B) was prepared from polypropylene homopolymer PP-1 shown in Table 1, ethylene copolymerized polypropylene polymer PP-3 shown in Table 1, and masterbatch A shown in Table 2, blended at a ratio of 1.2 wt %, 94.0 wt %, and 4.8 wt %, respectively. Thickness of thus produced film was 20 μm.

Example 5

The biaxially-oriented polypropylene film was produced in the same manner as Example 1 except that the base layer (A) and the surface layer (C) were prepared from polypropylene homopolymer PP-2 shown in Table 1 instead of PP-1, and the conditions for film formation was changed to b shown in Table 3. Thickness of thus produced film was 20 μm.

Comparative Example 1

The biaxially-oriented polypropylene film was produced in the same manner as Example 1 except that the surface layer (A) was prepared from polypropylene homopolymer PP-1 and PP-4 shown in Table 1, blended at a ratio of 60.0 wt % and 40.0 wt %, respectively, and the surface layer (B) was prepared from polypropylene homopolymer PP-1 shown in Table 1 and masterbatch A shown in Table 2 blended at a ratio of 96.4 wt % and 3.6 wt %, respectively. Thickness of thus produced film was 20 μm.

Comparative Example 2

The biaxially-oriented polypropylene film was produced in the same manner as Example 1 except that the surface layer (B) was not subjected to corona treatment. Thickness of thus produced film was 20 μm.

Comparative Example 3

The biaxially-oriented polypropylene film was produced in the same manner as Example 1 except that the surface layer (B) was prepared from polypropylene homopolymer PP-1 shown in Table 1, ethylene-copolymerized polypropylene polymer PP-3 shown in Table 1, and masterbatch A shown in Table 2, blended at a ratio of 45.0 wt %, 52.0 wt %, and 3.0 wt %, respectively, and the surface layer (C) was prepared solely from polypropylene homopolymer PP-1 shown in Table 1. Thickness of thus produced film was 20 μm.

Comparative Example 4

The biaxially-oriented polypropylene film was produced in the same manner as Example 1 except that the surface layer (B) was prepared from polypropylene homopolymer PP-1 shown in Table 1, ethylene-copolymerized polypropylene polymer PP-3 shown in Table 1, and masterbatch B shown in Table 2, blended at a ratio of 47.25 wt %, 52.00 wt %, and 0.75 wt %, respectively, and the surface layer (C) was prepared from polypropylene homopolymer PP-1 shown in Table 1 and masterbatch B shown in Table 2 blended at a ratio of 98.4 wt % and 1.60 wt %, respectively. In addition, the surface of the film contacted with a cooling roll was changed to the surface layer (C). Thickness of thus produced film was 20 μm.

Comparative Example 5

The biaxially-oriented polypropylene film was produced in the same manner as Example 1 except that the base layer (A) was prepared from polypropylene homopolymer PP-1 shown in Table 1 and stearyldiethanolamine stearate as an antistatic agent (KYM-4K, manufactured by Matsumoto Yushi-Seiyaku Co., Ltd.) blended at a ratio of 99.0 wt % and 1.0 wt %, respectively. Thickness of thus produced film was 20 μm.

Comparative Example 6

The biaxially-oriented polypropylene film was produced in the same manner as Example 1 except that the condition for film formation was changed to e shown in Table 3. Thickness of thus produced film was 20 μm.

Tables 4 and 5 show raw materials, production methods, and physical properties of the films in Examples and Comparative Examples.

TABLE 4

| | | | | Example 1 | Example 2 | Example 3 | Example 4 | Example 5 |
|---|---|---|---|---|---|---|---|---|
| Base layer (A) | Raw materials | PP-1 | weight % | 100.00 | 100.00 | 100.00 | 100.00 | 0.00 |
| | | PP-2 | weight % | 0.00 | 0.00 | 0.00 | 0.00 | 100.00 |
| | | PP-4 | weight % | | | | | |
| | | Antistatic agent | weight % | 0.00 | 0.00 | 0.00 | 0.00 | 0.00 |
| | | Thickness | μm | 17.7 | 15.1 | 17.7 | 17.7 | 17.7 |
| Surface layer (B) | Raw materials | PP-1 | weight % | 43.2 | 43.2 | 45.0 | 1.2 | 43.2 |
| | | PP-3 | weight % | 52.0 | 52.0 | 52.0 | 94.0 | 52.0 |
| | | Masterbatch containing anti-blocking agent | weight % | 4.8 | 4.8 | 3.0 | 4.8 | 4.8 |
| | | Masterbatch type | — | A | A | A | A | A |
| | | Content of anti-blocking agent | ppm by weight | 2400 | 2400 | 1500 | 2400 | 2400 |
| | | Thickness | μm | 1.3 | 3.9 | 1.3 | 1.3 | 1.3 |
| | | Surface treatment | | Corona treatment | Corona treatment | Corona treatment | Corona treatment | Corona treatment |
| Surface layer (C) | Raw materials | PP-1 | weight % | 93.6 | 93.6 | 93.6 | 93.6 | 0.0 |
| | | PP-2 | weight % | 0.0 | 0.0 | 0.0 | 0.0 | 93.6 |
| | | Masterbatch containing anti-blocking agent | weight % | 6.4 | 6.4 | 6.4 | 6.4 | 6.4 |
| | | Masterbatch type | — | A | A | A | A | A |
| | | Content of anti-blocking agent | ppm by weight | 3200 | 3200 | 3200 | 3200 | 3200 |
| | | Thickness | μm | 1.0 | 1.0 | 1.0 | 1.0 | 1.0 |
| | | Surface treatment | | N/A | N/A | N/A | N/A | N/A |
| In the film amount | | PP-1 | weight % | 95.99 | 88.60 | 96.11 | 93.26 | 2.81 |
| | | PP-2 | weight % | 0.00 | 0.00 | 0.00 | 0.00 | 93.18 |
| | | PP-3 | weight % | 3.38 | 10.14 | 3.38 | 6.11 | 3.38 |
| | | PP-4 | | | | | | |

TABLE 4-continued

|  |  |  |  |  |  |  |  |  |
|---|---|---|---|---|---|---|---|---|
|  |  | Antistatic agent | weight % | 0.00 | 0.00 | 0.00 | 0.00 | 0.00 |
|  |  | Masterbatch containing anti-blocking agent | weight % | 0.63 | 1.26 | 0.52 | 0.63 | 0.63 |
|  |  | Content of anti-blocking agent | ppm | 316 | 628 | 258 | 316 | 316 |
|  | Conditions for film formation (see Table 3) |  |  | a | a | a | a | b |

|  |  |  |  | Comparative Example 1 | Comparative Example 2 | Comparative Example 3 | Comparative Example 4 | Comparative Example 5 | Comparative Example 6 |
|---|---|---|---|---|---|---|---|---|---|
| Base layer (A) | Raw materials | PP-1 | weight % | 60.00 | 100.00 | 100.00 | 100.00 | 99.00 | 100.00 |
|  |  | PP-2 | weight % | 0.00 | 0.00 | 0.00 | 0.00 | 0.00 | 0.00 |
|  |  | PP-4 | weight % | 40.00 |  |  |  |  |  |
|  |  | Antistatic agent | weight % | 0.00 | 0.00 | 0.00 | 0.00 | 1.00 | 0.00 |
|  |  | Thickness | μm | 18 | 17.7 | 17.7 | 17.7 | 17.7 | 17.7 |
| Surface layer (B) | Raw materials | PP-1 | weight % | 96.4 | 43.2 | 45.0 | 47.3 | 43.2 | 43.2 |
|  |  | PP-3 | weight % | 0.0 | 52.0 | 52.0 | 52.0 | 52.0 | 52.0 |
|  |  | Masterbatch containing anti-blocking agent | weight % | 3.6 | 4.8 | 3.0 | 0.8 | 4.8 | 4.8 |
|  |  | Masterbatch type | — | A | A | A | B | A | A |
|  |  | Content of anti-blocking agent | ppm by weight | 1800 | 2400 | 1500 | 1500 | 2400 | 2400 |
|  |  | Thickness | μm | 1.0 | 1.3 | 1.3 | 1.3 | 1.3 | 1.3 |
|  |  | Surface treatment |  | Corona treatment | N/A | Corona treatment | Corona treatment | Corona treatment | Corona treatment |
| Surface layer (C) | Raw materials | PP-1 | weight % | 94.0 | 93.6 | 100.0 | 98.4 | 93.6 | 93.6 |
|  |  | PP-2 | weight % | 0.0 | 0.0 | 0.0 | 0.0 | 0.0 | 0.0 |
|  |  | Masterbatch containing anti-blocking agent | weight % | 6.0 | 6.4 | 0.0 | 1.6 | 6.4 | 6.4 |
|  |  | Masterbatch type | — | A | A | — | B | A | A |
|  |  | Content of anti-blocking agent | ppm by weight | 3000 | 3200 | 0 | 3200 | 3200 | 3200 |
|  |  | Thickness | μm | 1.0 | 1.0 | 1.0 | 1.0 | 1.0 | 1.0 |
|  |  | Surface treatment |  | N/A | N/A | N/A | N/A | N/A | N/A |
| In the film amount |  | PP-1 | weight % | 63.52 | 95.99 | 96.43 | 96.49 | 95.10 | 95.99 |
|  |  | PP-2 | weight % | 0.00 | 0.00 | 0.00 | 0.00 | 0.00 | 0.00 |
|  |  | PP-3 | weight % | 0.00 | 3.38 | 3.38 | 3.38 | 3.38 | 3.38 |
|  |  | PP-4 | weight % | 36.00 |  |  |  |  |  |
|  |  | Antistatic agent | weight % | 0.00 | 0.00 | 0.00 | 0.00 | 0.89 | 0.00 |
|  |  | Masterbatch containing anti-blocking agent | weight % | 0.48 | 0.63 | 0.20 | 0.13 | 0.63 | 0.63 |
|  |  | Content of anti-blocking agent | ppm | 240 | 316 | 98 | 64 | 316 | 316 |
|  | Conditions for film formation (see Table 3) |  |  | a | a | a | a | a | c |

TABLE 5

|  |  |  | Example 1 | Example 2 | Example 3 | Example 4 | Example 5 |
|---|---|---|---|---|---|---|---|
| Physical properties of film | Thickness | μm | 20 | 20 | 20 | 20 | 20 |
|  | Haze value | % | 2.7 | 2.8 | 2.6 | 2.9 | 3.3 |
|  | Tensile modulus (longitudinal direction) | GPa | 2.3 | 2.2 | 2.2 | 2.5 | 2.6 |
|  | Tensile modulus (width direction) | GPa | 4.6 | 4.5 | 4.7 | 4.8 | 5.3 |
|  | Heat shrinkage ratio at 150° C. (longitudinal direction) | % | 8.7 | 10.8 | 10.0 | 10.1 | 3.3 |
|  | Heat-shrinkage ratio at 150° C. (width direction) | % | 16.8 | 18.3 | 21.7 | 19.8 | 3.7 |
|  | Wetting tension (surface layer (B)) | mN/m | 43 | 43 | 42 | 43 | 42 |
|  | Surface resistance value (surface layer (B)) | LogΩ | 15.2 | 15.4 | 15.5 | 15.5 | 15.4 |
|  | Martens hardness HMs (surface layer (B)) | N/mm$^2$ | 240 | 235 | 220 | 220 | 230 |
|  | Center plane average surface roughness SRa (surface layer (B)) | μm | 0.022 | 0.024 | 0.015 | 0.024 | 0.021 |
|  | Arithmetic average roughness Ra (surface layer (B)) | nm | 4.3 | 4.8 | 4.1 | 5.0 | 4.4 |
|  | Maximum profile peak height Rp (surface layer (B)) | nm | 17.9 | 19.2 | 18.2 | 21.2 | 18.2 |
|  | Maximum profile valley depth Rv (surface layer (B)) | nm | 20.6 | 19.5 | 21.2 | 23.4 | 19.4 |

TABLE 5-continued

| | | | | | | | |
|---|---|---|---|---|---|---|---|
| | Rp + Rv (surface layer (B)) | nm | 38.5 | 38.7 | 39.4 | 44.6 | 37.6 |
| | Martens hardness HMs (surface layer (C)) | N/mm² | 300 | 290 | 280 | 290 | 320 |
| | Center plane average surface roughness SRa (surface layer (C)) | μm | 0.034 | 0.033 | 0.031 | 0.027 | 0.030 |
| | Dynamic friction coefficient (surface layer (B)/surface layer (C)) | — | 0.47 | 0.47 | 0.5 | 0.48 | 0.48 |
| | Degassing time required for adhering overlapped films (surface layer (B)/surface layer (C)) | seconds | 2.5 | 2.8 | 3.5 | 2.6 | 2.2 |
| Evaluation of film processability | Laminate strength (longitudinal direction) (surface layer (B)) | g/15 mm | 2.9 | 2.9 | 3.1 | 2.9 | 2.7 |
| | Evaluation of wrinkles on roll | Good, fair, bad | Good | Good | Fair | Good | Good |
| | Evaluation of coating suitability (surface layer (B)) | Excellent, good, bad, very bad | Excellent | Excellent | Excellent | Excellent | Excellent |
| | Adhesion evaluation of aluminum vapor deposited layer (surface layer (B)) | Excellent, good, bad, very bad | Good | Good | Good | Good | Good |

| | | | Comparative Example 1 | Comparative Example 2 | Comparative Example 3 | Comparative Example 4 | Comparative Example 5 | Comparative Example 6 |
|---|---|---|---|---|---|---|---|---|
| Physical properties of film | Thickness | μm | 20 | 20 | 20 | 20 | 20 | 20 |
| | Haze value | % | 2.3 | 2.7 | 2.5 | 2.9 | 3.4 | 6.2 |
| | Tensile modulus (longitudinal direction) | GPa | 2.3 | 2.3 | 2.2 | 2.3 | 2.1 | 2.4 |
| | Tensile modulus (width direction) | GPa | 4.6 | 4.6 | 4.5 | 4.5 | 4.4 | 4.9 |
| | Heat shrinkage ratio at 150° C. (longitudinal direction) | % | 9.1 | 8.7 | 9.2 | 8.4 | 9.7 | 8.0 |
| | Heat-shrinkage ratio at 150° C. (width direction) | % | 18.2 | 16.8 | 17.1 | 15.2 | 17.2 | 13.7 |
| | Wetting tension (surface layer (B)) | mN/m | 39 | 31 | 42 | 41 | 39 | 41 |
| | Surface resistance value (surface layer (B)) | LogΩ | 15.4 | 15.5 | 15.4 | 15.5 | 13.2 | 15.3 |
| | Martens hardness HMs (surface layer (B)) | N/mm² | 290 | 245 | 230 | 240 | 240 | 250 |
| | Center plane average surface roughness SRa (surface layer (B)) | μm | 0.018 | 0.023 | 0.015 | 0.027 | 0.025 | 0.025 |
| | Arithmetic average roughness Ra (surface layer (B)) | nm | 2.2 | 4.3 | 3.9 | 5.9 | 3.8 | 5.2 |
| | Maximum profile peak height Rp (surface layer (B)) | nm | 9.3 | 17.9 | 18.8 | 25.3 | 14.9 | 27.2 |
| | Maximum profile valley depth Rv (surface layer (B)) | nm | 10.7 | 20.6 | 20.2 | 29.2 | 20.8 | 30.2 |
| | Rp + Rv (surface layer (B)) | nm | 20.0 | 38.5 | 39.0 | 54.5 | 35.7 | 57.4 |
| | Martens hardness HMs (surface layer (C)) | N/mm² | 300 | 295 | 290 | 290 | 275 | 310 |
| | Center plane average surface roughness SRa (surface layer (C)) | μm | 0.023 | 0.034 | 0.012 | 0.028 | 0.024 | 0.028 |
| | Dynamic friction coefficient (surface layer (B)/surface layer (C)) | — | 0.47 | 0.43 | 0.62 | 0.38 | 0.25 | 0.44 |
| | Degassing time required for adhering overlapped films (surface layer (B)/surface layer (C)) | seconds | 3.8 | 3.0 | 12.0 | 3.0 | 2.4 | 2.7 |
| Evaluation of film processability | Laminate strength (longitudinal direction) (surface layer (B)) | g/15 mm | 0.4 | 2.6 | 2.7 | 2.6 | 2.9 | 2.7 |
| | Evaluation of wrinkles on roll | Good, fair, bad | Good | Good | Bad | Good | Good | Good |
| | Evaluation of coating suitability (surface layer (B)) | Excellent, good, bad, very bad | Good | Bad | Excellent | Bad | Very bad | Bad |

TABLE 5-continued

| Adhesion evaluation of aluminum vapor deposited layer (surface layer (B)) | Excellent, good, bad, very bad | Very bad | Very bad | Good | Bad | Good | Bad |
|---|---|---|---|---|---|---|---|

The biaxially-oriented polypropylene films produced in Examples 1 to 5 had high adhesion, enabling the film to show high laminate strength, no peeling off of the aluminum vapor deposited layer, and no repelling of the coating. In addition, the film rolls had no wrinkles and had high blocking resistance.

In contrast, the films of Comparative Examples 1 to 6 had low adhesion and the film rolls showed undesirable winding states.

INDUSTRIAL APPLICABILITY

The biaxially-oriented polypropylene film of the present invention shows high adhesion in lamination with a vapor deposited layer or a coated layer, or other type of film, and shows good slipperiness and blocking resistance, therefore, the film is suitable for films to be processed. The film can be used for labels or for food packaging for confectionery and the like. Since the film can be manufactured at low costs, the film is industrially useful.

The invention claimed is:

1. A biaxially-oriented polypropylene film, comprising
a base layer (A) comprising a first polypropylene resin as a main component,
a surface layer (B) comprising a second polypropylene resin and provided at one side of the base layer (A), and
a surface layer (C) comprising a third polypropylene resin and provided at one side of the base layer (A) opposite to the surface layer (B),
wherein the surface layer (B) satisfies the following (1) to (5):
  (1) the surface layer (B) has a wetting tension of 38 mN or more;
  (2) the surface layer (B) has a surface resistance value of 14.0 Log Ω or more;
  (3) the surface layer (B) has an arithmetic average roughness (Ra) of 3.0 nm or more and 5.5 nm or less;
  (4) the surface layer (B) has a Martens hardness of 248 N/mm$^2$ or less; and
  (5) the surface layer (B) has a center plane average surface roughness (SRa) of 0.010 or more and 0.026 μm or less,
wherein the surface layer (C) satisfies the following (6) and (7):
  (6) the surface layer (C) has a center plane average surface roughness (SRa) of 0.020 μm or more and
  (7) the surface layer (C) has a Martens hardness of 270 N/mm$^2$ or more,
wherein the second polypropylene resin comprises (i) a mixture of two or more different polypropylene resins having different melt flow rates and (ii) one or more anti-blocking agents, and
wherein the third polypropylene resin comprises (i) a polypropylene homopolymer as a main component and (ii) one or more anti-blocking agents.

2. The biaxially-oriented polypropylene film according to claim 1, wherein the film has a dynamic friction coefficient of 0.6 or less.

3. The biaxially-oriented polypropylene film according to claim 1, wherein the film has a haze value of 5% or less.

4. The biaxially-oriented polypropylene film according to claim 1, wherein the surface layer (B) has a maximum profile peak height Rp+a maximum profile valley depth Rv of 30 or more and 50 nm or less.

5. The biaxially-oriented polypropylene film according to claim 1, wherein the film has a degassing time required for adhering overlapped films of 10 seconds or less.

6. The biaxially-oriented polypropylene film according to claim 1, wherein the film has a thickness of 9 μm or more and 200 μm or less.

7. A laminate, comprising the biaxially-oriented polypropylene film according to claim 1 and an unstretched polyethylene film.

8. The laminate according to claim 7, wherein the laminate has a laminate strength of 2.0 g/15 mm or more.

* * * * *